Dec. 24, 1935.                O. HAUCKE                    2,025,051
                         ALIGNMENT INDICATOR
                         Filed Feb. 1, 1935              2 Sheets-Sheet 1
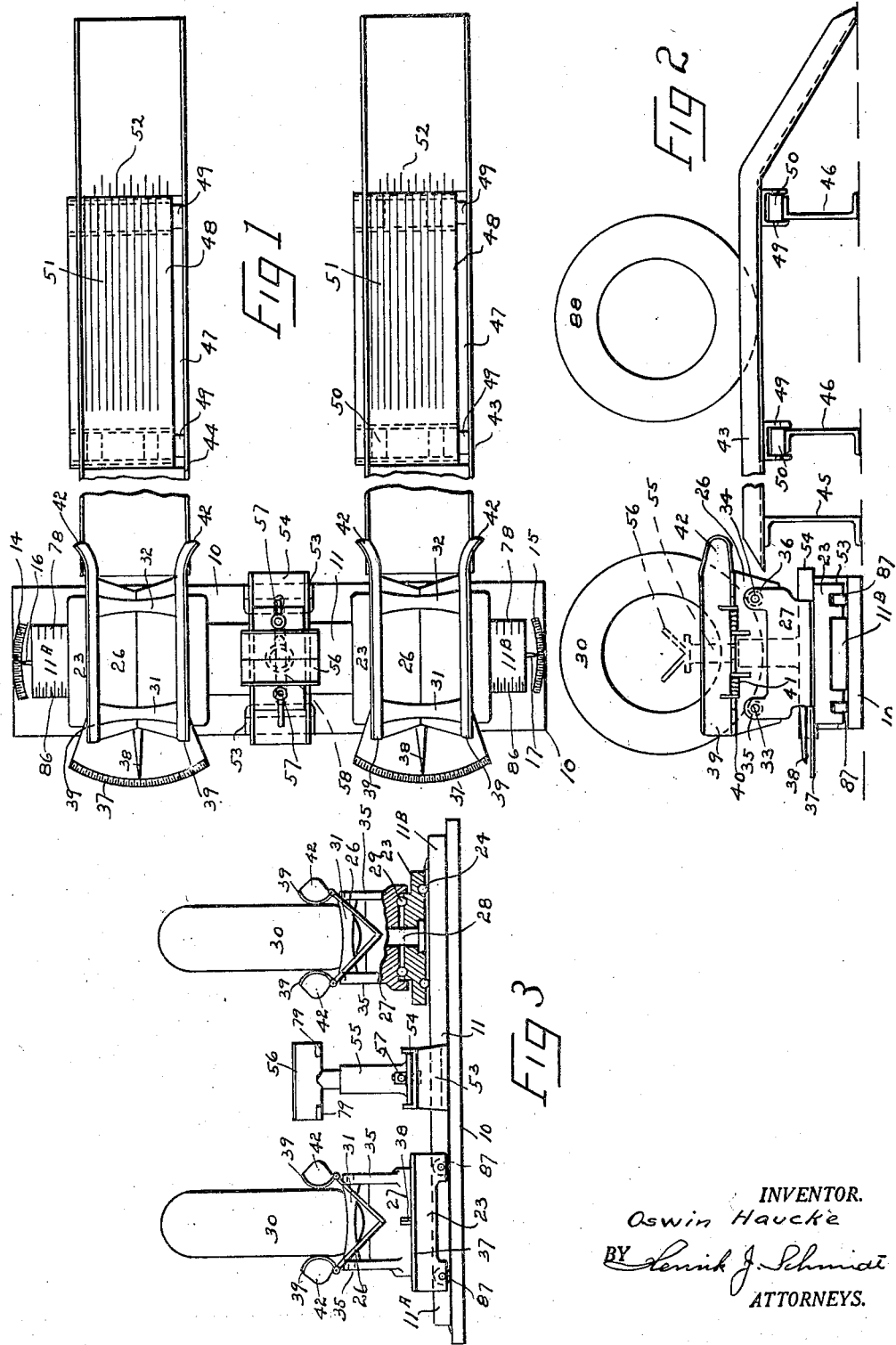
INVENTOR.
Oswin Haucke
BY
ATTORNEYS.

Dec. 24, 1935.  O. HAUCKE  2,025,051
ALIGNMENT INDICATOR
Filed Feb. 1, 1935   2 Sheets-Sheet 2
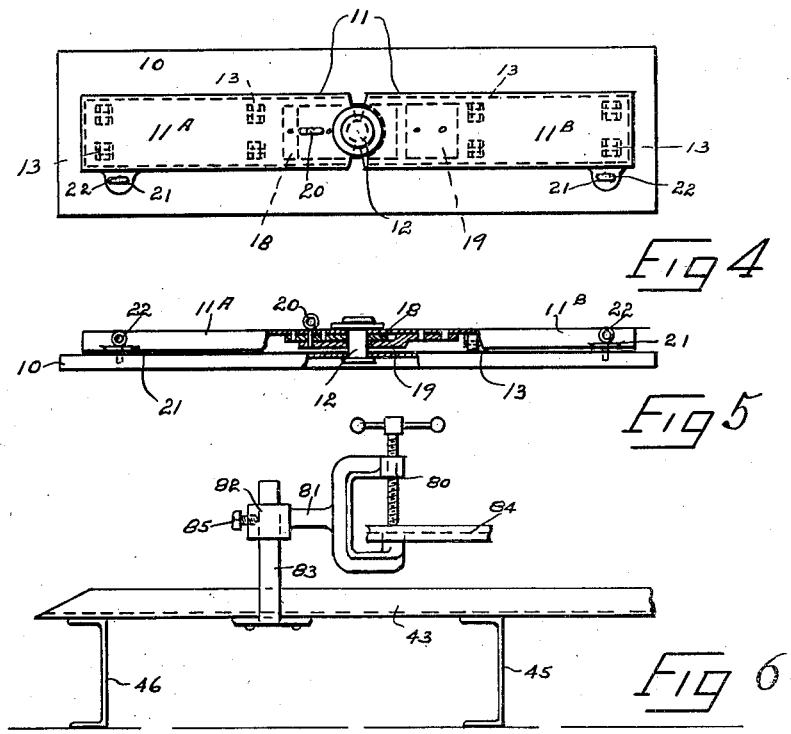
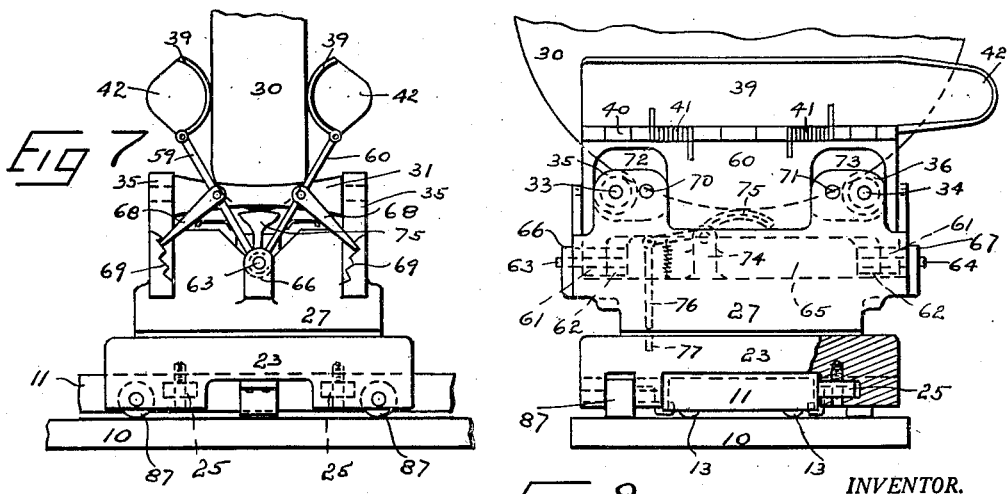
INVENTOR.
Oswin Haucke,
BY
ATTORNEYS.

Patented Dec. 24, 1935

2,025,051

UNITED STATES PATENT OFFICE 2,025,051

ALIGNMENT INDICATOR

Oswin Haucke, Brooklyn, N. Y.

Application February 1, 1935, Serial No. 4,489

11 Claims. (Cl. 33—203)

The invention relates to alignment indicators such as are used, for example, for the alignment of the wheels and chassis of vehicles, particularly those of the automotive type, and is a further improvement on my application for Letters Patent filed March 31, 1934, Serial No. 718,369.

It has for one of its main objects to provide an indicator by means of which all the various alignments of the wheels and chassis of a vehicle may be checked simultaneously. Another object is to so construct a device that the steering-gear mechanism of the vehicle may be tested not only for inaccuracies in adjustment or alignment, but as to the various angular adjustments imparted to this mechanism.

A further object is to provide the indicator with various systems of scales by means of which each individual alignment test will be readily indicated and checked so as to show with great accuracy the degree of possible misalignment or misadjustment which may exist. A still further object is to so construct the indicator that it may be used on automobiles of all sizes and makes.

Additional objects are to provide a device of simple and strong construction, requiring but slight skill to operate, which will effect a substantial saving in both time and labor, and which can be manufactured and installed at a comparatively low price.

These and various other objects and advantages will be readily understood from the following description and from the accompanying drawings of a preferred embodiment of the invention, in which, however, modifications may be made without departing from the scope of the appended claims. In the drawings Fig. 1 is a plan view of the invention, Fig. 2 a side elevation, Fig. 3 a front view with certain parts shown in cross-section and with certain details omitted, Fig. 4 a plan view of certain parts of the device, Fig. 5 a front view of Fig. 4 shown partly in cross-section, Fig. 6 a fragmental side view of certain parts of the device, Fig. 7 a front view of certain parts of the device shown on a larger scale to bring out certain details, and Fig. 8 a side view of Fig. 7.

Referring now first to Figs. 1, 2, 3, 4 and 5, the device consists of a base 10 on which a beam 11 is rotatingly mounted on a stud 12. The beam is free to rotate on the stud and is supported on rollers 13 or other anti-friction means to facilitate its turning. Scales 14 and 15 are mounted on the base and pointers 16 and 17 are secured on the end of the beam. By these means the amount of rotation of the beam is indicated.

The beam 11 is made of two parts, 11A and 11B, each of which may be rotated independent of the other, or which may be locked together so as to operate as a single unit. This is accomplished by riveting a straight hinge 18 to the part 11A and an offset hinge 19 to the part 11B, as plainly shown in Figs. 4 and 5. Both of these hinges are contained within the beam and turn on the stud 12. Holes are drilled through the beam and through both the hinges to receive a pin 20. With this pin in place the beam operates as a single unit. Brackets 21 are provided on each end of the beam and these brackets are provided with holes which are aligned with similar holes drilled in the base 10. Pins 22 may be inserted in these holes so as to lock the whole beam to the base, or to lock either end of the beam when the pin 20 is withdrawn.

Two carriages 23 are mounted on the beam and are free to slide along it on antifriction bearings 24, which engage on its top face, and on rollers 25, which engage against its sides. These last-mentioned rollers are shown in Figs. 7 and 8. On top of each carriage, a wheel cradle 26 is mounted on a base 27. The base is rotatingly mounted on the carriage 23 by means of a stud 28, and a ball bearing is preferably placed between the two parts, as shown at 29.

The cradles 26 are formed in the shape of a V in which the wheel 30 of an automobile will center itself. They may be made of a single piece of metal, as shown in Figs. 1, 2 and 3, but the side members are preferably hinged together, as shown in Figs. 7 and 8. The construction of these hinged side members, or adjustable cradles, will be described later.

Referring now particularly to Figs. 1, 2 and 3, concave rollers 31 and 32 are mounted crosswise in the wheel cradles to center the wheels lengthwise. These rollers are free to turn on pins 33 and 34 which are supported in pairs of bearings 35 and 36 formed at each end of the bases 27. A scale 37 is mounted on each of the carriages 23 and a pointer 38 on each of the bases 27. By means of these any rotation of the cradles in relation to the beam 11 is plainly indicated. A pair of leaves 39 are hinged to the upper edges of each cradle so as to further assist in the correct centering of the wheels. These leaves are hinged at 40 and springs 41 tend to force them against the wheels. Their rear ends 42 are flared outwardly to facilitate the entering of the wheels in the cradles.

A pair of runways 43 and 44 are mounted in rear of the cradles on beams 45 and 46. Their rear ends are inclined to enable a car to be driven up on them, and their height is approximately the same as the height which the front wheels will assume when resting in the cradles. A piece of the flooring is cut away in each of the runways, as shown at 47, and in these openings sidewardly sliding plates 48 are placed. Channel beams 49 are secured to the undersides of these plates and in these channel beams rollers 50 are mounted. These rollers engage on top of the beams 46. Scales 51 are provided on the plates and scales 52 on the flooring of the runways adjacent to the rear ends of the plates. The objects of these scales will be explained later.

A pair of pedestals 53 are mounted in the center of the base 10, as shown in Figs. 1 and 3, and a channel beam 54 is secured on top of these so as to extend over the beam 11. A height-adjustable jack 55, which is provided with a V shaped head 56, is slidingly mounted in the channel beam 54 and may be clamped in any position by means of bolts 57 which slide in a slot 58 formed in the channel beam. This jack is used when it is desired to clamp the front axle of a car, but its exact use will be described later.

Reference is now had to Figs. 7 and 8, in which, as previously said, the cradles are formed of two hinged side members. These side members 59 and 60 are provided with downwardly extending lugs 61 and 62 through which the pins 63 and 64 pass. This leaves an open space in the bottom of each cradle, as shown at 65. The pins 63 and 64 are, respectively, mounted in brackets 66 and 67 formed on the bases 27. To support the side members they are provided with pawls 68 which may be engaged in any one of a plurality of notches 69 which are formed on the base 27. By inserting the pawls in the correct notches, the cradles may be adjusted to receive various sized tires.

In Figs. 7 and 8, the brackets 35 and 36 are made wider so that extra holes 70 and 71 may be provided in which the pins 33 and 34 may be inserted so as to shorten the distance between the concave rollers 31 and 32, when this is desirable. Large openings 72 and 73 are also provided in the side members 59 and 60 so as to accommodate the rollers which pass through these members.

To prevent the bases 27 from turning on the carriage 23 until the wheels are properly entered into the cradles, the following mechanism is employed. A bearing 74 is provided on the base, as shown in Fig. 8. It extends up between the side members 59 and 60 and is placed in the space 65 formed between these members. A lever 75 is mounted in this bearing and one end of this lever is adapted to be depressed by the wheel 30 as it rests in the cradle. To the other end of the lever a rod 76 is attached and this rod locks in a hole 77, formed in the carriage 23, when the wheel is not in the cradle. The hole 77 is so located that the cradle will be held in correct alignment with its runway, but the hole is large enough to allow for some "play".

The device is employed in the following manner. The side members of the wheel cradles are adjusted to the approximate size of the tires on the car to be tested, after which the car is driven over the runways until the front wheels rest in the cradles; the carriages sliding on the beam 11 to adjust themselves to the distance between the wheels. As the front wheels now depress the lever 75, the bases 27 are free to rotate on the carriages 23.

As the car is driven on the runways, the sliding plates 48 are evenly aligned with the runways, so that the center lines of the scales 51 and 52 coincide. After the front wheels are lodged in the cradles, the distance between the centers of the treads of the rear wheels and the centers of the treads of the front wheels may be compared by reading the scales 51 and sets of scales 78 impressed in the rear edges of the beam, as shown in Fig. 1. If the beam has been locked to the base, by the pins 22, the parallelism of the front and rear axles may now be tested by the gauge described in my pending application described above.

While the front wheels are now centered in the cradles, the carriages 23 may not be at the same distance from the center of the beam. This may be ascertained by the scales 78. If required, the carriages are centered on the beam until both scales 78 read alike. To center the rear wheels 88, the sliding plates 48 are moved, in the same way that the carriages were, until the readings on the scales 51 and 52 indicate that the front and rear wheels are in line. This shifting of the carriages and the plates is made easy by the antifriction bearings employed.

When the wheels have been aligned, as just described, the "toe-in" of the front wheels may at once be checked by the positions of the pointers 38 on the scales 37. These readings will indicate whether the proper amount of "toe-in" exist and whether the "toe-in" on both wheels is alike.

When the steering mechanism is to be checked, the jack 55 is moved back or forth until it is directly under the front axle, after which it is extended until the head 56 engages the axle. The axle may now be clamped to the jack by the use of a pair of C-clamps (not shown) which are placed under the lugs 79 and over the axles, in the well known manner in which such clamps are used. This prevents the car from moving in relation to the device.

In cases where it is not desirable, or convenient, to use the jack just described, the clamp illustrated in Fig. 6 may be employed. This consists of a clamp 80 having a rearwardly extending arm 81 which terminates in a collar 82 which is slidingly and rotatingly mounted on a post 83. This post is riveted to the outside of the runway. This clamp is used for clamping the running board of the car, a fragment of which is shown at 84. The clamp is turned on the post 83 until it is over the running board, after which it is clamped to this board, and finally the screw 85 in the collar is tightened against the post. A single clamp of this kind may be employed, or one may be used on each runway. These clamps, when desired, may also be used together with the jack.

After the car has been clamped to the device and the pins 22 withdrawn, the front wheels may be turned in either direction by the steering wheel of the car. As the wheels are turned, not only do the bases 27 turn on the carriages 23, but the carriages slide on the beam 11 and the beam rotates on the base 10, thus the three actual movements of each wheel are each accurately and simultaneously indicated. The turning of the bases 27 may be read on the scales 37, the turning of each end of the beam on the scales 14 and 15 and the sliding movements of the carriages on the scales 78. However, as the scales 78, when used in combination with the scales 51 and 52 on the runways, can be rather coarse, I prefer to impress very accurate scales on the front edges of the beam, as shown at 86.

It is this simultaneous recording of all the three movements of the front wheels which constitutes the real invention in this indicator, as this construction makes it possible to calculate any condition in the steering mechanism from the various reading of the various scales. Not only may the actual amount of each movement be checked, but the readings may be checked against each other so as to ascertain such conditions, for example, as the camber angles of each wheel and the angles of inclination of the king-pins and whether these king-pin angles are negative or positive. The beam may, as previously described be used as a single unit or each end may be used independently of the other, according to the nature of the test to be made. Likewise, one end of the beam may be held stationary while the other is free to rotate.

To prevent tilting of the carriages 23 when the car is driven into the cradles and to relieve the consequent strain on the bearings 24, a plurality of rollers 87 are employed on the carriages. However, these rollers only engage on the base if the carriages tilt when the front wheels enter and leave the cradles. While I prefer to use elevated runways, these might be dispensed with by placing the beam and its parts, as well as the sliding plates 48, in pits in the floor.

While I have illustrated and described the use of the indicator as used in connection with automotive vehicles, I intend to use it for any other purpose to which it may be adapted.

Having described the invention and its objects, what I claim as new is:

1. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; and the carriages so mounted upon the beam that the turning of the front wheels of such vehicle will cause them to slide endwardly on the beam as the cradles and the beam are turned by the action of the wheels.

2. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; and means for indicating the amount of movements imparted to said cradles, carriages and beam.

3. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; and said beam constructed of two sections, hinged together at the rotating point of the whole beam, so that each section may turn independently.

4. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; said beam constructed of two sections, hinged together at the rotating point of the whole beam, so that each section may turn independently; and means for locking either of the sections against rotation on the base.

5. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; said beam constructed of two sections, hinged together at the rotating point of the whole beam, so that each section may turn independently; means for locking either of the sections against rotation on the base; and means for indicating the amount of movements imparted to said cradles, carriages and beam sections.

6. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; and means for locking said cradles against rotation on the carriages; said locking means being disengageable by the wheels entered into the cradles.

7. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; and means for adjusting the cradles to various sizes of wheels.

8. In a device of the class described; a pair of wheel-centering cradles; each of said cradles rotatingly mounted on a carriage; said carriages mounted upon a beam; said beam rotatingly mounted at its center upon a base; means for clamping a vehicle on the device with its front axle in fixed relation to said base; and the carriages so mounted upon the beam that the turning of the wheels on such vehicles will cause them to slide endwardly on the beam as the cradles and the beam are turned by the actions of the wheels.

9. In a device of the class described; a pair of wheel-centering cradles; each of said cradles rotatingly mounted on a carriage; each of said carriages mounted upon a beam section; said beam sections rotatingly mounted upon a base; means for clamping the front axle of a vehicle in fixed relation to said base; the carriages being so mounted upon the beam that the turning of the front wheels of such vehicle will cause them to slide endwardly upon the beam as the cradles and the beam sections are turned by the action of the wheels; and means for locking either of the beam sections against rotation relative to the base.

10. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such vehicle will cause them to slide endwardly on the beam as the cradles and the beam are turned by the action of the wheels; a pair of runways for guiding the front wheels into the cradles and for supporting the rear wheels; and means associated with said runways for moving the rear wheels to align them with the front wheels.

11. In a device of the class described; a pair of wheel-centering cradles; each of said cradles rotatingly mounted on a carriage; said carriages mounted upon a beam; said beam rotatingly mounted at its center upon a base; means for clamping the front axle of a vehicle in fixed relation to said base; the carriages so mounted upon the beam that the turning of the front wheels of such wheels will cause them to slide endwardly on the beam as the cradles and the beam are turned by the action of the wheels; a pair of runways for guiding the front wheels into the cradles and for supporting the rear wheels; means associated with said runways for moving the rear wheels to align them with the front wheels; and means for indicating any difference in the spacings between the front and the rear wheels.

OSWIN HAUCKE.